(12) United States Patent
Lu et al.

(10) Patent No.: US 7,961,265 B2
(45) Date of Patent: Jun. 14, 2011

(54) ARRAY SUBSTRATE, DISPLAY PANEL HAVING THE SAME AND METHOD OF DRIVING THE SAME

(75) Inventors: Jian-Gang Lu, Suwon-si (KR);
Hee-Seop Kim, Hwaseong-si (KR);
Young-Chol Yang, Seongnam-si (KR);
Seung-Hoon Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 337 days.

(21) Appl. No.: 12/192,671

(22) Filed: Aug. 15, 2008

(65) Prior Publication Data
US 2009/0086118 A1    Apr. 2, 2009

(30) Foreign Application Priority Data
Oct. 2, 2007   (KR) .................. 10-2007-0099438

(51) Int. Cl.
*G02F 1/136* (2006.01)
(52) U.S. Cl. .............. 349/48; 349/38; 349/39; 349/129; 349/144
(58) Field of Classification Search .................... 349/48, 349/144
See application file for complete search history.

(56) References Cited

U.S. PATENT DOCUMENTS
2006/0103800 A1 * 5/2006 Li et al. .................. 349/129
* cited by examiner

*Primary Examiner* — Richard H Kim
(74) *Attorney, Agent, or Firm* — Innovation Counsel LLP

(57) ABSTRACT

An array substrate includes first and second gate lines, a data line, a pixel electrode, a domain electrode, first, second and third switching elements, and a voltage-changing part. The domain-dividing electrode divides the first and second pixel parts into a plurality of areas. The first, second and third switching elements are controlled by a first gate signal applied from the first gate line. The first, second and third switching elements apply a data signal received from the data line to the first and second pixel parts and the domain-dividing electrode, respectively. The voltage-changing part is controlled by a second gate signal applied from the second gate line. The voltage-changing part increases a voltage level of the domain-dividing electrode and decreases a voltage level of the second pixel part.

17 Claims, 7 Drawing Sheets

ARRAY SUBSTRATE, DISPLAY PANEL HAVING THE SAME AND METHOD OF DRIVING THE SAME

CROSS-REFERENCE TO RELATED APPLICATIONS

This application claims priority under 35 U.S.C. §119 to Korean Patent Application No. 10-2007-99438, filed on Oct. 2, 2007 in the Korean Intellectual Property Office (KIPO), the contents of which are herein incorporated by reference in their entirety.

BACKGROUND OF THE INVENTION

1. Field of the Invention

The present invention relates to an array substrate, a display panel having the array substrate, and a method of driving the display panel. More particularly, the present invention relates to an array substrate adapted to a liquid crystal display (LCD) device, a display panel having the array substrate, and a method of driving the display panel.

2. Description of the Related Art

Generally, a liquid crystal display (LCD) device includes an LCD panel that displays an image using a light-transmitting ratio of liquid crystal molecules, and a backlight assembly disposed below the LCD panel to provide the LCD panel with light.

Typically the LCD panel includes a first substrate (i.e., an array substrate), a second substrate (i.e., an opposite substrate) facing the first substrate and a liquid crystal layer interposed between the first and second substrates. The array substrate includes a plurality of signal lines, a plurality of thin-film transistors (TFTs) electrically connected to the signal lines and a plurality of pixel electrodes electrically connected to the TFT. The opposite substrate typically includes a color filter associated with each pixel electrode and a common electrode.

When an electric field is applied to the liquid crystal layer, an arrangement of liquid crystal molecules of the liquid crystal layer is altered to change optical transmissivity, so that light directed toward the liquid crystal molecules is transmitted through the color filter to display a color.

The LCD panel may be operative in a patterned vertical alignment (PVA) mode in order to enhance a viewing angle of the image. A common electrode divides the pixel electrode to form a plurality of domain areas.

When an opening is formed in the common electrode through a patterning process, a texture error may be generated in an area corresponding to the opening so that display quality may be reduced.

SUMMARY OF THE INVENTION

The present invention provides an array substrate capable of providing enhanced image quality by suppressing generation of texture error.

The present invention also provides a display panel having the above-mentioned array substrate.

The present invention also provides a method of driving the above-mentioned display panel.

In one aspect of the present invention, an array substrate includes first and second gate lines, a data line, a pixel electrode, a domain-dividing electrode, first, second and third switching elements, and a voltage-changing part.

The first and second gate lines are formed in a first direction. The data line is formed in a second direction substantially crossing the first direction. The pixel electrode has first and second pixel parts that are spaced apart from each other. The domain-dividing electrode divides the first and second pixel parts into a plurality of areas, respectively. The first, second and third switching elements each has a control electrode coupled to the first gate line. The first, second and third switching elements are controlled by a first gate signal applied from the first gate line. The first, second and third switching elements apply a data signal applied from the data line to the first and second pixel parts and the domain-dividing electrode, respectively. The voltage-changing part is coupled to the second gate line. The voltage-changing part is controlled by a second gate signal applied from the second gate line. The voltage-changing part increases a voltage level of the domain-dividing electrode and decreases a voltage level of the second pixel part.

In an exemplary embodiment, the voltage-changing part may include a voltage-changing transistor, a voltage-increasing capacitor and a voltage-decreasing capacitor. The voltage-changing transistor may include a voltage-changing control electrode electrically connected to the second gate line, a voltage-changing input electrode electrically connected to the second pixel part, and a voltage output electrode corresponding to the voltage-changing input electrode. The voltage-increasing capacitor may include a first increasing electrode electrically connected to the domain-dividing electrode and a second increasing electrode electrically connected to the voltage-changing output electrode. The voltage-decreasing capacitor may include a first decreasing electrode electrically connected to the voltage-changing output electrode and a second decreasing electrode receiving a reference voltage.

In an exemplary embodiment, the voltage-changing output electrode may be overlapped with a portion of the domain-dividing electrode so as to form the voltage-changing capacitor.

In an exemplary embodiment, the array substrate may further include a storage line being overlapped with a portion of the first and second pixel parts to receive the reference voltage. Here, the voltage-changing output electrode is overlapped with a portion of the storage line so as to form the voltage-decreasing capacitor.

In an exemplary embodiment, the storage line may include a main storage part and a sub storage part. The main storage part may be formed adjacent to the second gate line along the first direction to be overlapped with a portion of the voltage-changing output electrode. The sub storage part may be protruded from the main storage part to be overlapped with a portion of the first and second pixel parts.

In an exemplary embodiment, the sub storage part may include a first storage line and a second sub storage line. The first storage line may be formed along the second direction to be overlapped with a portion of at least one of the first and second pixel parts. The second sub storage line may be formed along the second direction to be opposite to the first sub storage line. The second sub storage line may be overlapped with a portion of another of the first and second pixel parts.

In an exemplary embodiment, the domain-dividing electrode may include a first division part spaced apart from the first pixel part to divide the first pixel part, and a second division part spaced apart from the second pixel part to divide the second pixel part. Here, the first and second division parts may be electrically connected to each other.

In an exemplary embodiment, the second pixel part may surround an external portion of the first pixel part, and the first increasing electrode may be electrically connected to the second division part.

In an exemplary embodiment, the array substrate may further include a first insulating layer covering the gate line, and a second insulating layer covering the data line formed on the first insulating layer. Here, the pixel electrode and the domain-dividing electrode may be formed on the second insulating layer. Alternatively, the pixel electrode may be formed on the second insulating layer, and the domain-dividing electrode may be formed between the first and second insulating layers.

In an exemplary embodiment, the first switching element may include a first control electrode electrically connected to the first gate line, a first input electrode electrically connected to the data line, and a first output electrode electrically connected to the first pixel part.

In an exemplary embodiment, the second switching element may include a second control electrode electrically connected to the first gate line, a second input electrode electrically connected to the data line, and a second output electrode electrically connected to the second pixel part.

In an exemplary embodiment, the third switching element may include a third control electrode electrically connected to the first gate line, a third input electrode electrically connected to the data line, and a third output electrode electrically connected to the domain-dividing electrode.

In another aspect of the present invention, an array substrate includes first and second gate lines, first and second data lines, a pixel electrode, a domain-dividing electrode, first and second switching elements, a first voltage-changing part, third and fourth switching elements, and a second voltage-changing part.

The first and second gate lines are extended in a first direction. The first and second data lines are extended in a second direction substantially crossing the first direction. The pixel electrode has first and second pixel parts that are spaced apart from each other. The domain-dividing electrode has a first division part that divides the first pixel part into a plurality of areas and a second division part that divides the second pixel part into a plurality of areas.

The first and second switching elements are controlled by a first gate signal applied from the first gate line. The first and second switching elements applying a first data signal applied from the first data line to the first pixel part and the first division part, respectively. The first voltage-changing part is controlled by a second gate signal applied from the second gate line. The first voltage-changing part increases a voltage level of the first division part and decreases a voltage level of the first pixel part.

The third and fourth switching elements are controlled by the first gate signal. The second voltage-changing part applies a second data signal applied from the second gate line to the second pixel part and the second division part, respectively. The second voltage-changing part is controlled by the second gate signal. The second voltage-changing part increases a voltage level of the second division part and decreases a voltage level of the second pixel part.

In still another aspect of the present invention, a display panel includes an array substrate, an opposite substrate opposite to the array substrate and a liquid crystal layer interposed between the array and opposite substrates. The array substrate includes first and second gate lines, a data line, a pixel electrode, a domain-dividing electrode, first, second and third switching elements, and a voltage-changing part.

The first and second gate lines are formed in a first direction. The data line is formed in a second direction crossing the first direction. The pixel electrode has first and second pixel parts that are spaced apart from each other. The domain-dividing electrode divides the first and second pixel parts into a plurality of areas, respectively. The first, second and third switching elements are controlled by a first gate signal applied from the first gate line. The first, second and third switching elements apply a data signal applied from the data line to the first and second pixel parts and the domain-dividing electrode, respectively. The voltage-changing part is controlled by a second gate signal applied from the second gate line. The voltage-changing part increases a voltage level of the domain-dividing electrode and decreases a voltage level of the second pixel part.

In further still another aspect of the present invention, a first voltage having a first polarity is charged in a capacitor of a voltage-changing part. Then, a second voltage having a second polarity opposite to the first polarity is applied to a first pixel part, a second pixel part spaced apart from the first pixel part and a domain-dividing electrode that divides the first and second pixel parts into a plurality of areas. Then, the first voltage of the voltage-changing part and the second voltage of the second pixel part are mixed to decrease a voltage level of the second pixel part and to increase a voltage level of the domain-dividing electrode.

According to the above present invention, a domain-dividing electrode dividing first and second pixel parts is formed in a first array substrate, a viewing angle of images may be enhanced except that a common electrode of an opposite substrate is patterned. Therefore, display quality of the images may be enhanced.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Figure 1:
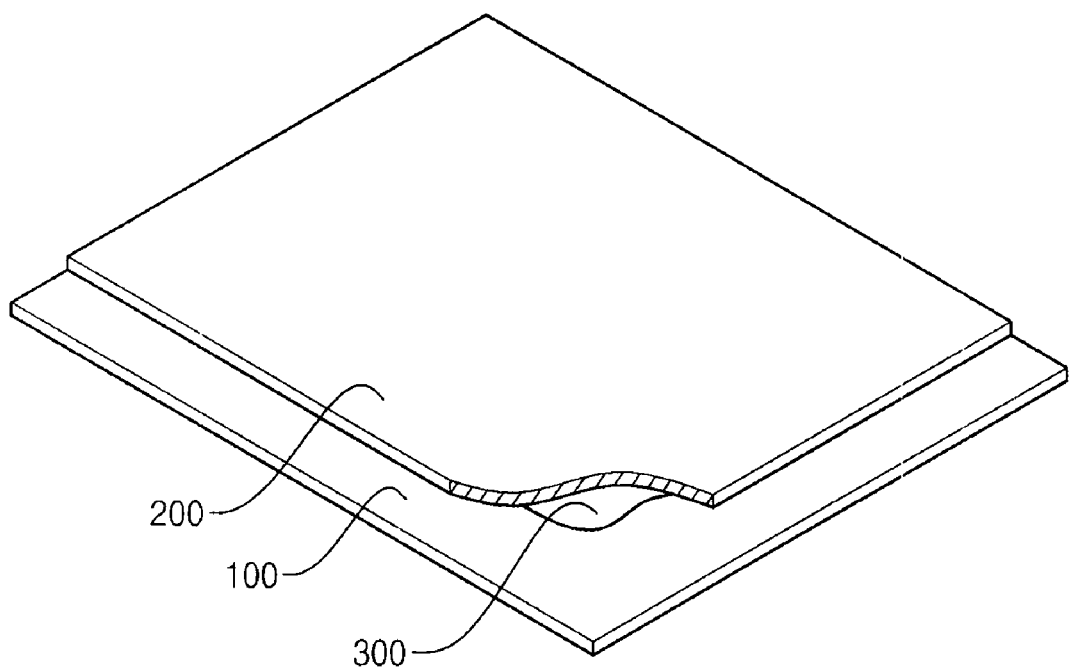
FIG. 1 is a perspective view showing a display panel according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-sectional views that illustrate idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention is described in detail with reference to the accompanying drawings.

FIG. 1 is a perspective view showing a display panel according to an exemplary embodiment of the present invention.

Referring to FIG. 1, a display panel according to an exemplary embodiment of the present invention includes a first substrate (i.e., an array substrate) 100, a second substrate (i.e., an opposite substrate) 200 and a liquid crystal layer 300. The array substrate 100 may include a plurality of pixel electrodes disposed in a matrix, a plurality of thin-film transistors (TFTs) for applying a driving voltage to each of the pixel electrodes, and a plurality of signal lines for driving the TFTs. The opposite substrate 200 is disposed to face the array substrate 100. The opposite substrate 200 may include a common electrode formed thereon. The common electrode may include an optically transparent and electrically conductive material.

The liquid crystal layer 300 is interposed between the array substrate 100 and the opposite substrate 200. Therefore, when an electric field is applied to the liquid crystal layer 300, an arrangement of liquid crystal molecules of the liquid crystal layer 300 is altered to change optical transmissivity, so that an image is displayed.

Figure 2:
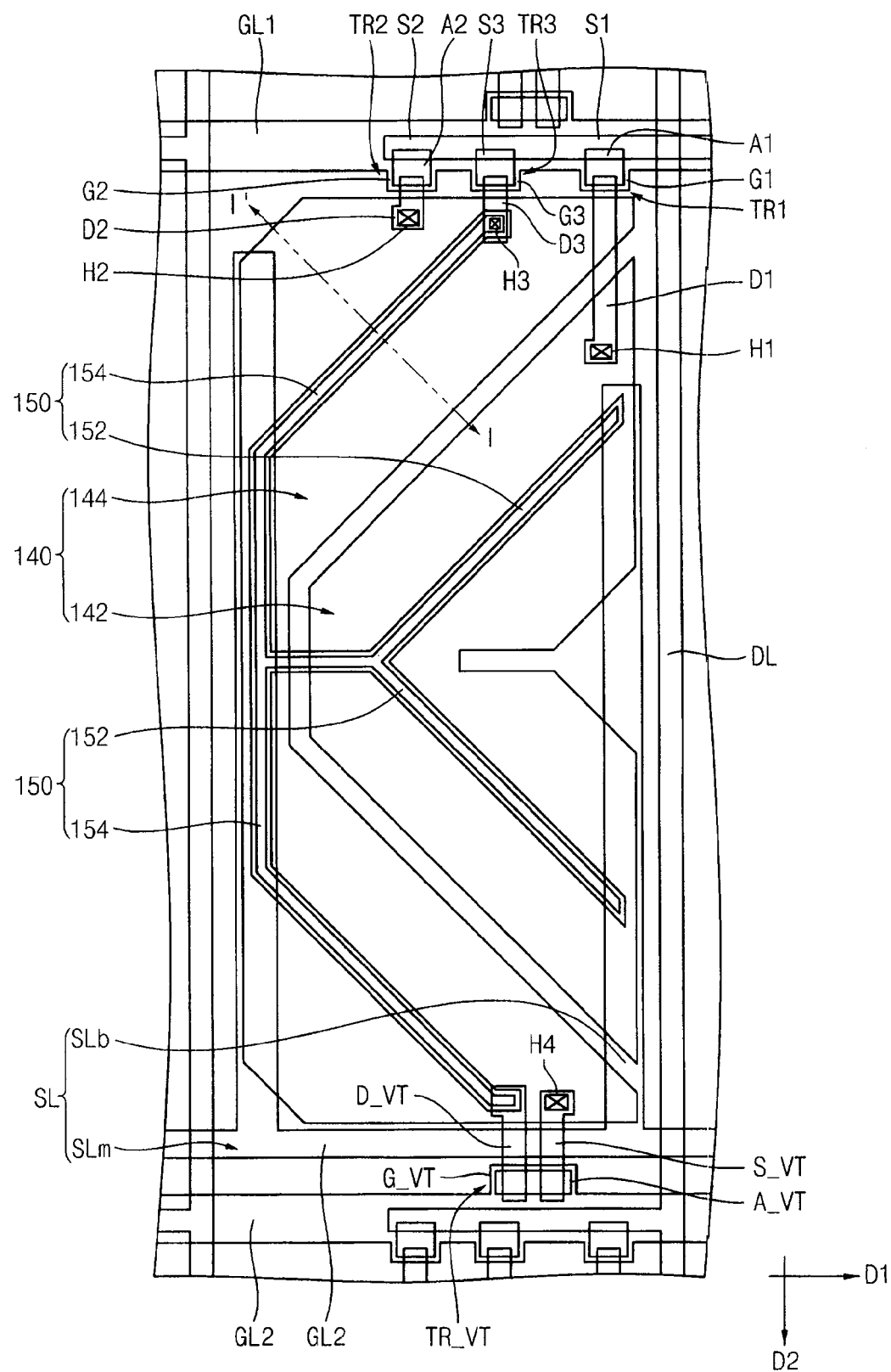
FIG. 2 is a plan view showing a unit pixel of the type used in the display panel of FIG. 1.
Figure 3:
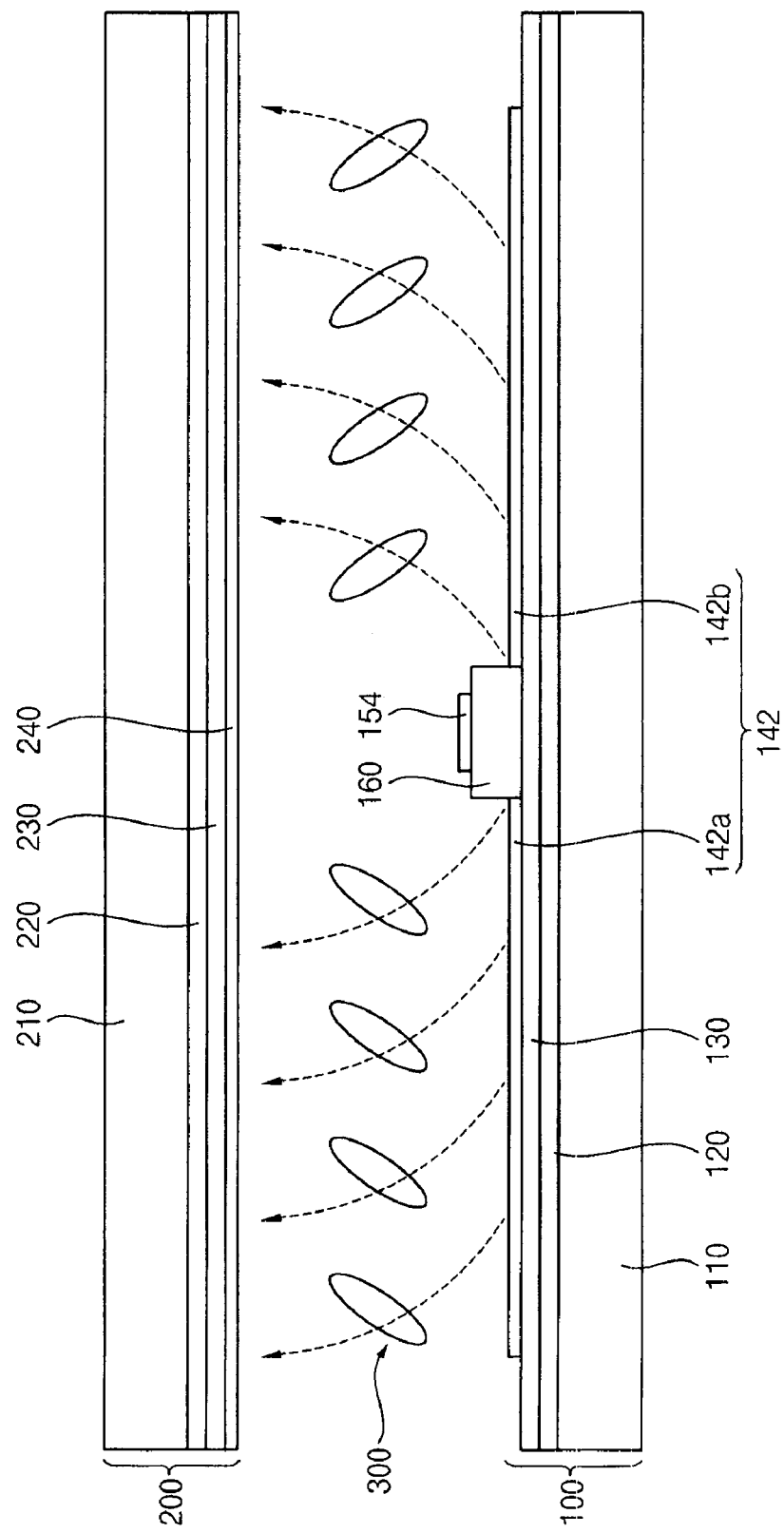
FIG. 3 is a cross-sectional view taken along a line I-I' of FIG. 2.

FIG. 2 is a plan view showing a unit pixel of the display panel of FIG. 1. FIG. 3 is a cross-sectional view taken along a line I-I' of FIG. 2.

Referring to FIGS. 2 and 3, the array substrate 100 includes a first base substrate 110, a first gate line GL1, a second gate line GL2, a storage line SL, a first insulating layer 120, a data line DL, a second insulating layer 130, a pixel electrode 140, a domain-dividing electrode 150 and an insulating structure 160.

The first base substrate 110 may include a flat shape. The first base substrate 110 may be comprised of an optically transparent material such as glass, quartz, or plastic.

The first and second gate lines GL1 and GL2 are formed on the first base substrate 110 along a first direction D1. The storage line SL is spaced apart from the first and second gate lines GL1 and GL2 to be formed on the first base substrate 110. The storage line SL may be formed between the first and second gate lines GL1 and GL2 in substantially parallel with the first direction D1. The first and second gate lines GL1 and GL2 and the storage line SL may be comprised of, for example, aluminum (Al), or an aluminum alloy.

The first insulating layer 120 is formed on the first base substrate 110 to cover the first and second gate lines GL1 and GL2 and the storage line SL. The first insulating layer 120 may be comprised of, for example, an insulating material such as silicon nitride (SiNx) or silicon oxide (SiOx).

The data line DL is formed on the first insulating layer 120 along a second direction D2 crossing the first direction D1. The first and second directions D1 and D2 may be substantially perpendicular to each other. The data line DL may be comprised of an aluminum (Al) series metal such as aluminum, aluminum alloy, a silver (Ag) series metal such as silver, silver alloy, a copper (Cu) series metal such as copper, copper alloy, a molybdenum (Mo) series metal such as molybdenum, molybdenum alloy, and a metal including chromium (Cr), titanium (Ti), tantalum (Ta), tungsten (W), silver (Ag), copper (Cu), or an alloy thereof. For example, the data line DL may include a multilayer structure that includes two electrically conductive films (not shown) that are different from each other. One of the conductive films may include a low resistivity metal such as an aluminum (Al) series metal, a silver (Ag) series metal, a copper (Cu) series metal, so as to decrease a signal delay or a voltage drop. The remaining conductive film may include a material having superior adhesive characteristics with indium tin oxide (ITO) and indium zinc oxide (IZO), such as a molybdenum (Mo) series metal, chromium (Cr), titanium (Ti), or tantalum (Ta). One combination of the data line DL may include a lower layer of chromium and an upper layer of aluminum. Another combination of the data line DL may include a lower layer of aluminum and an upper layer of molybdenum.

The second insulating layer 130 is formed on the first insulating layer 120 to cover the data line DL. The second insulating layer 130 may include, for example, an insulating material such as silicon nitride (SiNx) and silicon oxide (SiOx). Alternatively, an organic insulating layer (not shown) may be formed on the second insulating layer 130.

The pixel electrode 140 is formed on the second insulating layer 130, and is disposed within a unit pixel. The pixel electrode 140 is comprised of an optically transparent and electrically conductive material such as indium tin oxide (ITO), or indium zinc oxide (IZO).

The pixel electrode 140 includes a first pixel part 142 and a second pixel part 144 that are spaced apart from each other. The second pixel part 144 may surround a peripheral portion of the first pixel part 142. The first and second pixel parts 142 and 144 may have a substantially symmetrical shape with respect to an imaginary central line (not shown) that crosses a central portion of the unit pixel along the first direction D1. For example, the first and second pixel parts 142 and 144 may have a substantially V-shape, respectively.

The domain-dividing electrode 150 is formed on the second insulating layer 130 to divide the first and second pixel parts 142 and 144. The domain-dividing electrode 150 may include a first division part 152 spaced apart from the first pixel part 142 to divide the first pixel part 142, and a second division part 154 spaced apart from the second pixel part 144 to divide the second pixel part 144.

The first division part 152 may divide the first pixel part 142 into two parts along a central portion of the first pixel part 142, and the second division part 154 may divide the second pixel part 144 into two parts along a central portion of the second pixel part 144. Therefore, the first pixel part 142 may be divided into a first left electrode 142a and a first right electrode 142b. Moreover, the second pixel part 144 may be divided into a second left electrode and a second right electrode. The first left electrode 142a and the first right electrode 142b are electrically connected to each other, and the second left electrode and the second right electrode are electrically connected to each other.

The first and second division parts 152 and 154 may have a symmetric shape with respect to the central line in correspondence with the first and second pixel electrodes 142 and 144. For example, the first and second division parts 152 and 154 may have a substantially V-shape, respectively. The first and second division parts 152 and 154 may be electrically connected to each other.

The insulating structure 160 is formed between the domain-dividing electrode 150 and the second insulating layer 130. That is, the insulating structure 160 is formed on the second insulating layer 130 to divide the first and second pixel parts 142 and 144. The domain-dividing electrode 150 is formed on the insulating structure 160. Use of insulating structure 160 is optional.

A thickness of the insulating structure 160 may be greater than that of the pixel electrode 140. Therefore, the domain-dividing electrode 150 may be closely to the opposite substrate 200. A width of the domain-dividing electrode 150 may be smaller than that of the insulating structure 160.

Figure 4:
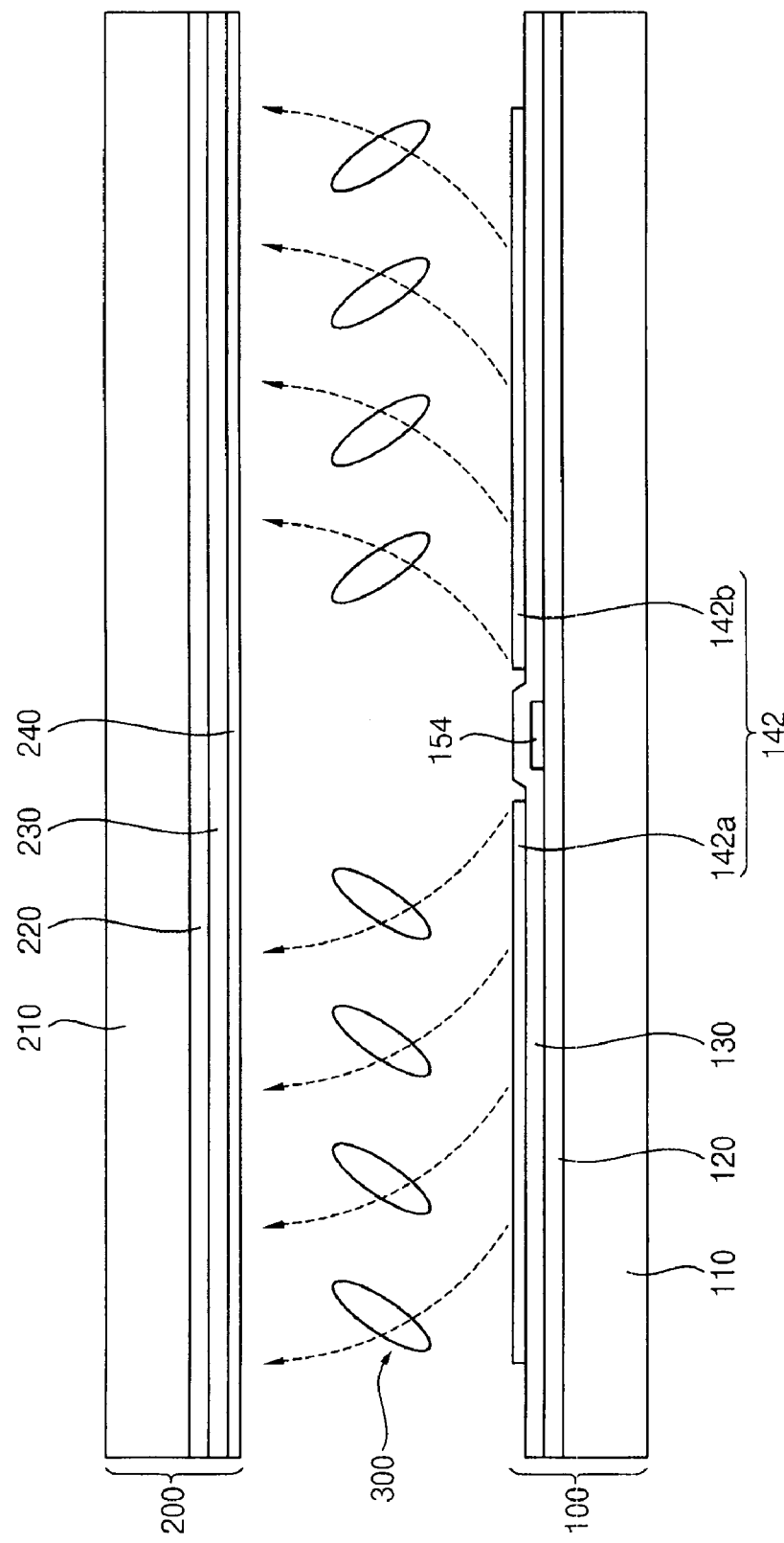
FIG. 4 is a cross-sectional view showing a portion of the display panel according to a second exemplary embodiment of the present invention.

Alternatively, the first and second pixel parts 142 and 144 may be divided by the insulating structure 160 as shown in FIG. 4. That is, the first and second pixel parts 142 and 144 may be formed below the insulating structure 160.

The array substrate 100 further includes a first transistor TR1, a second transistor TR2, a third transistor TR3 and a voltage-changing transistor TR_VT.

The first transistor TR1 includes a first control electrode G1, a first active pattern A1, a first input electrode S1 and a first output electrode D1. For example, the first control electrode G1 protrudes from the first gate line GL1. The first active pattern A1 is formed on the first insulating layer 120 to overlap with the first control electrode G1. The first input electrode S1 is electrically connected to the data line DL, and is formed on a portion of the first active pattern A1. The first output electrode D1 is spaced apart from the first input electrode S1 to be formed on a portion of the first active pattern A1, and is overlapped with a portion of the first pixel part 142. The first output electrode D1 is electrically connected to the first pixel part 142 through a first contact hole H1 formed through the second insulating layer 130.

The second transistor TR2 includes a second control electrode G2, a second active pattern A2, a second input electrode S2 and a second output electrode D2. For example, the second control electrode G2 protrudes from the first gate line GL1. The second active pattern A2 is formed on the first insulating layer 120 to be overlapped with the second control electrode G2. The second input electrode S2 is electrically connected to the data line DL, and is formed on a portion of the second active pattern A2. The second output electrode D2 is spaced apart from the second input electrode S2 to be formed on a portion of the second active pattern A2, and is overlapped with a portion of the second pixel part 144. The second output electrode D2 is electrically connected to the second pixel part 144 through a second contact hole H2 formed through the second insulating layer 130.

The third transistor TR3 includes a third control electrode G3, a third active pattern A3, a third input electrode S3 and a third output electrode D3. For example, the third control electrode G3 protrudes from the first gate line GL1. The third active pattern A3 is formed on the first insulating layer 120 to be overlapped with the third control electrode G3. The third input electrode S3 is electrically connected to the data line DL, and is formed on a portion of the third active pattern A3. The third output electrode D3 is spaced apart from the third input electrode S3 to be formed on a portion of the third active pattern A3, and is overlapped with a portion of the second division part 154. The third output electrode D3 is electrically connected to the second division part 154 through a third contact hole H3 formed through the insulating structure 160.

The voltage-changing transistor TR_VT includes a voltage-changing control electrode G_VT, a voltage-changing active pattern A_VT, a voltage-changing input electrode S_VT and a voltage-changing output electrode D_VT. For example, the voltage-changing control electrode G_VT protrudes from the second gate line GL2. The voltage-changing active pattern A_VT is formed on the first insulating layer 120 to be overlapped with the voltage-changing control electrode G_VT. The voltage-changing input electrode S_VT is overlapped with a portion of the second pixel part 144 to be formed on a portion of the voltage-changing active pattern A_VT. The voltage-changing input electrode S_VT is electrically connected to the second pixel part 144 through a fourth contract hole H4 formed through the second insulating layer. The voltage-changing output electrode D_VT is spaced apart from the voltage-changing input electrode S_VT to be formed on a portion of the voltage-changing active pattern A_VT. The voltage-changing output electrode D_VT is overlapped with a portion of the second division part 154 to form a voltage-increasing capacitor.

The first to third input electrodes S1, S2 and S3 may be integrated in an integrally formed structure. That is, a protruding electrode protruded from the data line may form the first to third input electrodes S1, S2 and S3. Moreover, the first to third control electrodes G1, G2 and G3 may be integrally formed in an integrally formed structure.

The storage line SL may overlap with a portion of the first and second pixel parts 142 and 144, and is overlapped with a portion of the voltage-changing output electrode D_VT. For example, the storage line SL may include a main storage line SLm, a first sub-storage line SLa and a second sub storage line SLb.

The main storage line SLm may be formed in substantially parallel with the first direction D1. The main storage line SLm overlaps a portion of the voltage-changing output electrode D_VT to form a voltage-decreasing capacitor.

The first sub storage line SLa is formed along the second direction D2 and overlaps with a portion of the second pixel part 144. The second sub-storage line SLb is formed along the second direction D2 overlapping a portion of the first pixel part 142. The first and second storage lines SLa and SLb may be disposed to be faced two edge portions of the unit pixel.

The opposite substrate 200 is disposed to face the array substrate 100. The opposite substrate 200 may include a second base substrate 210, a color filter 220, a filter insulating layer 230 and a common electrode 240.

The second base substrate 210 may be disposed to face the first base substrate 110. The second base substrate 210 may have a flat shape. The second base substrate 210 may include an optically transparent material such as glass, quartz, and plastic.

The color filter 220 is formed on the second base substrate 210 to face the array substrate 100. The color filter 220 may include, for example, a red color filter, a green color filter and a blue color filter.

The filter insulating layer 230 is formed on the color filter 220 to protect the color filter 220. The filter insulating layer 230 may include, for example, an organic insulating layer. The filter insulating layer 230 may be optionally omitted.

The common electrode 240 is formed on the filter insulating layer 230. The common electrode 240 may include an optically transparent and electrically conductive material such as indium tin oxide (ITO), indium zinc oxide (IZO), etc. The common electrode 240 formed on the filter insulating layer 230 may not have an opening formed through a patterning process.

In this embodiment, when an electric field is formed between the pixel electrode 140 and the common electrode 240, an arrangement of liquid crystal molecules of the liquid crystal layer 300 is altered. Here, when a voltage applied to the domain-dividing electrode 150 is greater than that of the pixel electrode, the electric field formed between the pixel electrode 140 and the common electrode 240 may be formed to slant along an external direction with respect to the domain-dividing electrode 150. Therefore, the display panel according to the present exemplary embodiment may display an image having a wide viewing angle even though the common electrode 240 has the opening.

FIG. 4 is a cross-sectional view showing a portion of the display panel according to a second exemplary embodiment of the present invention. The display panel of FIG. 4 is substantially the same as the display panel of FIG. 3 except for at least a domain-dividing electrode. Thus, identical reference numerals are used in FIG. 4 to refer to components that are the same or like those shown in FIG. 3, and thus, a detailed description is unnecessary.

Referring to FIGS. 2 and 4, the domain-dividing electrode 150, in accordance with the present exemplary embodiment, is formed between the first and second insulating layers 120 and 130. The domain-dividing electrode 150 is disposed a position capable of dividing the first and second pixel parts 142 and 144.

The domain-dividing electrode 150 may include a first division part 152 spaced apart from the first pixel part 142 to divide the first pixel part 142, and a second division part 154 spaced apart from the second pixel part 144 to divide the second pixel part 144.

The first division part 152 may divide the first pixel part 142 into two parts along a central portion of the first pixel part 142, and the second division part 154 may divide the second pixel part 144 into two parts along a central portion of the second pixel part 144. Therefore, the first pixel part 142 may be divided into a first left electrode 142a and a first right electrode 142b. Moreover, the second pixel part 144 may be divided into a second left electrode and a second right electrode.

The first and second division parts 152 and 154 may have a symmetric shape with respect to the central line in correspondence with the first and second pixel electrodes 142 and 144. For example, the first and second division parts 152 and 154 may have a substantially V-shape, respectively. The first and second division parts 152 and 154 may be electrically connected to each other.

Figure 5:
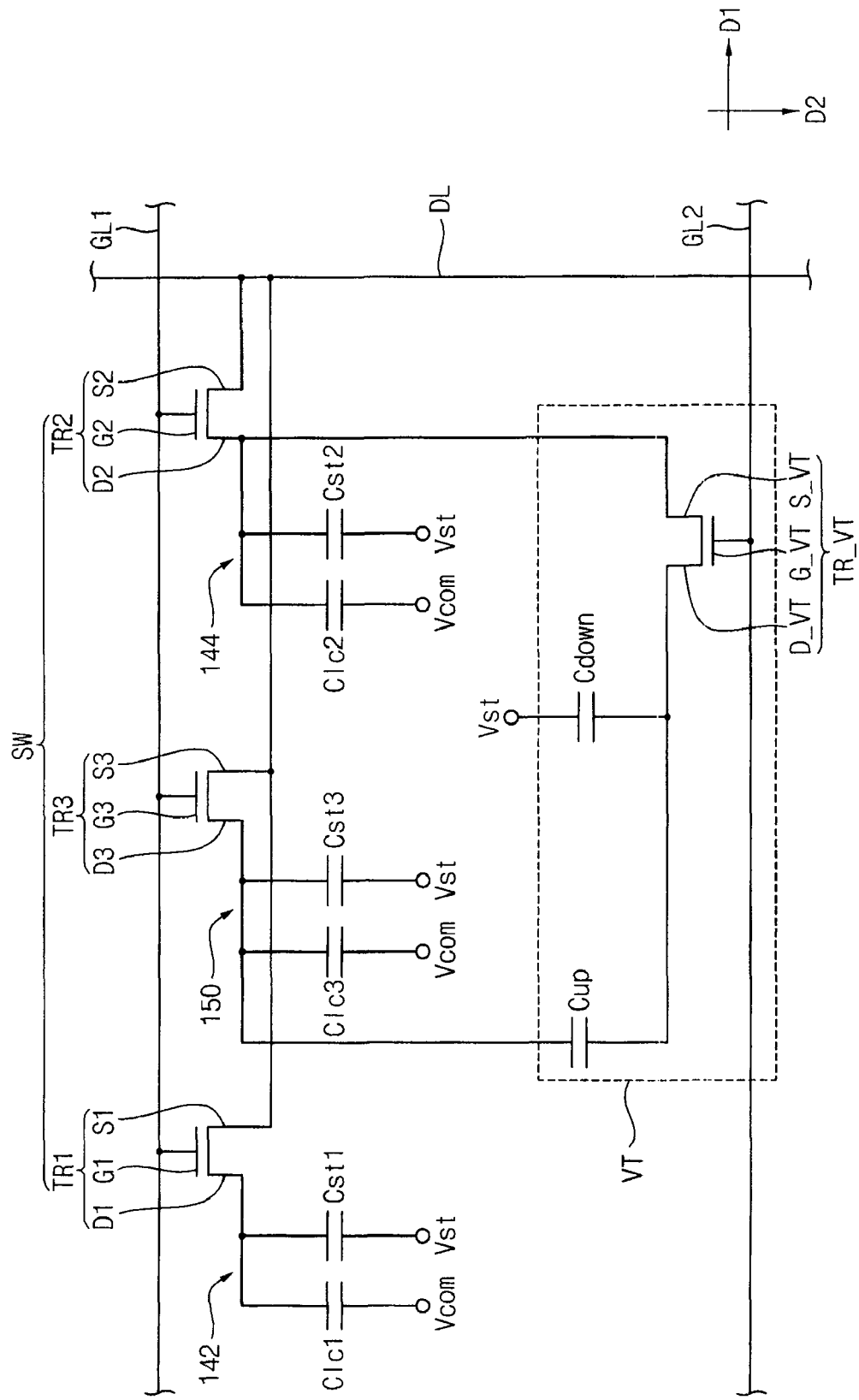
FIG. 5 is a schematic circuit diagram illustrating the relationship between the elements of the unit pixel of a display panel according to a first exemplary embodiment of the present invention.

FIG. 5 is a schematic circuit diagram illustrating the relationship between the elements of the unit pixel of a display panel according to a first exemplary embodiment of the present invention. The schematic circuit diagram as shown in FIG. 5 shows relationship of the elements of unit pixel of the display panel of FIGS. 2 to 4.

Referring to FIG. 5, a display panel of the first exemplary embodiment includes a first gate line GL1, a second gate line GL2, a data line DL, a pixel electrode, a domain-dividing electrode 150, a switching element part SW and a voltage-changing part VT.

The first and second gate lines GL1 and GL2 are formed in a first direction D1. The data line DL is formed in a second direction D2 substantially crossing the first direction D1. The first and second directions D1 and D2 are substantially perpendicular to each other.

The pixel electrode includes a first pixel part 142 and a second pixel part 144 that are spaced apart from each other. The domain-dividing electrode 150 divides the first and second pixel parts 142 and 144, respectively. For example, the domain-dividing electrode 150 may include a first division part that divides the first pixel part 142, and a second division part that divides the second pixel part 144.

The switching element part SW is electrically connected to the first gate line GL1 and the data line DL, and is electrically connected to the first and second pixel parts 142 and 144 and the domain-dividing electrode 150. The switching element part SW is controlled by a first gate signal applied from the first gate line GL1 to apply a data signal applied from the data line DL to the first and second pixel parts 142 and 144 and the domain-dividing electrode 150, respectively.

For example, the switching element part SW may include a first transistor TR1, a second transistor TR2 and a third transistor TR3.

The first transistor TR1 includes a first control electrode G1 electrically connected to the first gate line GL1, a first input electrode S1 electrically connected to the data line DL, and a first output electrode D1 electrically connected to the first pixel part 142.

The second transistor TR2 includes a second control electrode G2 electrically connected to the first gate line GL1, a second input electrode S2 electrically connected to the data line DL, and a second output electrode D2 electrically connected to the second pixel part 144.

The third transistor TR3 includes a third control electrode G3 electrically connected to the first gate line GL1, a third input electrode S3 electrically connected to the data line DL, and a third output electrode D3 electrically connected to the domain-dividing electrode 150.

The voltage-changing part VT is electrically connected to the second gate line GL2, the second pixel part 144 and the domain-dividing electrode 150. The voltage-changing part VT is controlled by a second gate signal applied from the second gate line GL2 to increase a voltage level of the domain-dividing electrode 150 and decrease a voltage level of the second pixel part 144.

For example, the voltage-changing part VT may include a voltage-changing transistor TR_VT, a voltage-increasing capacitor Cup and a voltage-decreasing capacitor Cdown.

The voltage-changing transistor TR_VT includes a voltage-changing control electrode G_VT electrically connected to the second gate line GL2, a voltage-changing input electrode S_VT electrically connected to the second pixel part 144, and a voltage-changing output electrode D_VT.

The voltage-increasing capacitor Cup includes a first increasing electrode electrically connected to the domain-dividing electrode 150, and a second increasing electrode electrically connected to the voltage-changing output electrode D_VT. The voltage-decreasing capacitor Cdown includes a first decreasing electrode electrically connected to the voltage-changing output electrode D_VT, and a second decreasing electrode receiving a reference voltage Vst.

Moreover, the display panel according to the present embodiment may further include a first liquid crystal capacitor Clc1, a first storage capacitor Cst1, a second liquid crystal capacitor Clc2, a second storage capacitor Cst2, a third liquid crystal capacitor Clc3 and a third storage capacitor Cst3.

The first liquid crystal capacitor Clc1 includes a first terminal electrically connected to the first pixel part 142 and a second terminal receiving a common voltage Vcom. The first storage capacitor Cst1 includes a first terminal electrically connected to the first pixel part 142 and a second terminal receiving the reference voltage Vst.

The second liquid crystal capacitor Clc2 includes a first terminal electrically connected to the second pixel part 144 and a second terminal receiving a common voltage Vcom. The second storage capacitor Cst2 includes a first terminal electrically connected to the second pixel part 144 and a second terminal receiving the reference voltage Vst.

The third liquid crystal capacitor Clc3 includes a first terminal electrically connected to the domain-dividing electrode 150 and a second terminal receiving a common voltage Vcom. The third storage capacitor Cst3 includes a first terminal electrically connected to the domain-dividing electrode 150 and a second terminal receiving the reference voltage Vst.

Figure 6:
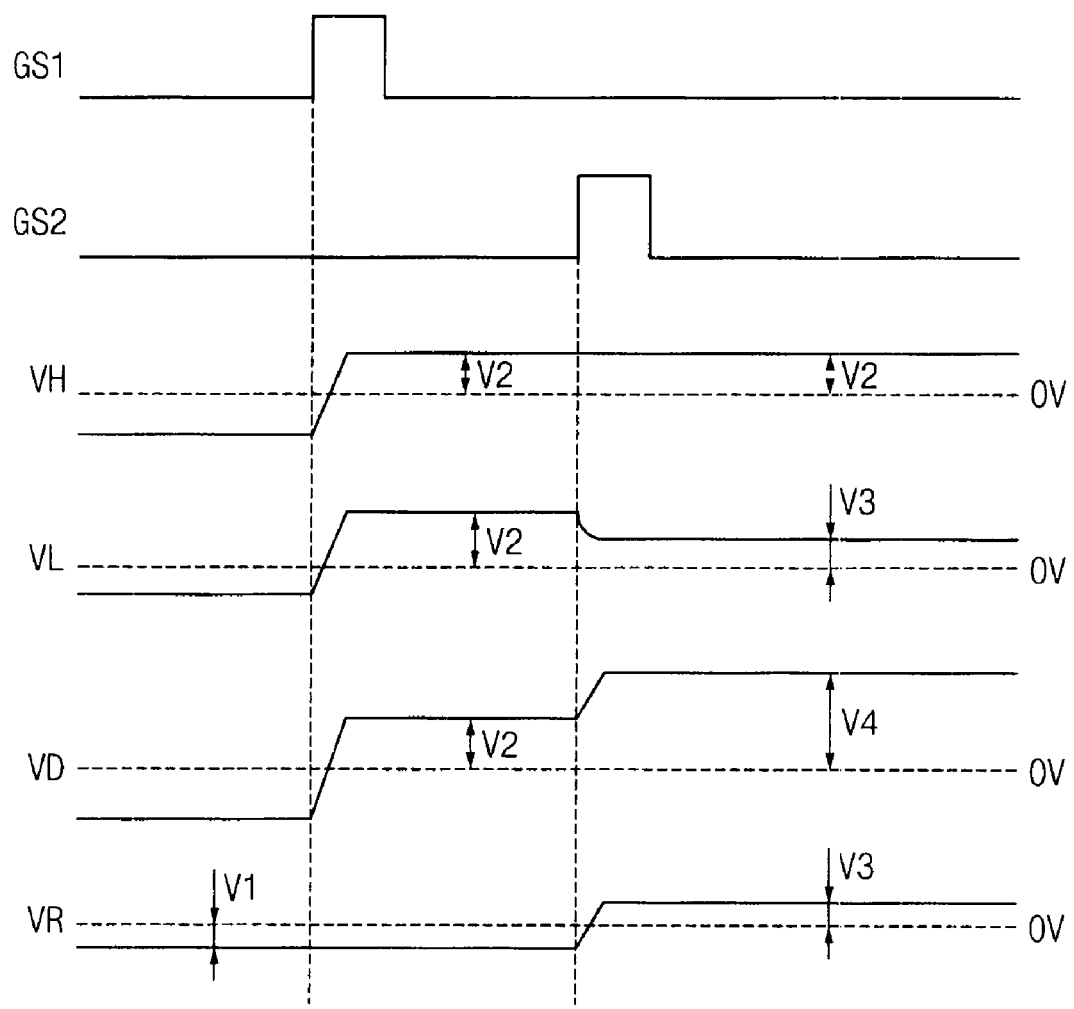
FIG. 6 shows waveform diagrams for the driving method of a unit pixel of the type shown in FIG. 5.

FIG. 6 shows waveform diagrams showing a driving method of unit pixel of FIG. 5.

Referring to FIGS. 5 and 6, a method of driving a display panel according to the present exemplary embodiment is described below.

A reference charging voltage VR is charged in a capacitor of the voltage-changing part VT. The reference charging voltage VR is charged between the voltage-increasing capacitor Cup and the voltage-decreasing capacitor Cdown. The reference charging voltage VR may be a first voltage having a first polarity. For example, the reference charging voltage VR may be about −2 V.

When the reference charging voltage VR is charged between the voltage-increasing capacitor Cup and the voltage-decreasing capacitor Cdown, a high pixel voltage VH and a low pixel voltage VL are charged in the first pixel part 142 and the second pixel part 144, respectively. Moreover, a domain-dividing voltage VD is charged in the domain-dividing electrode 150. The high pixel voltage VH, the low pixel voltage VL and the domain-dividing voltage VD may have the first polarity, that is, a negative polarity.

Then, a first gate signal GS1 is applied to the first gate line GL1, and then a data signal applied from the data line DL is outputted to the first and second pixel parts 142 and 144 and the domain-dividing electrode 150. The data signal may have a second polarity opposite to the first polarity. For example, the second voltage may be about −5 V. Therefore, the second voltage V2 is charged in the first and second pixel parts 142 and 144 and the domain-dividing electrode 150.

Then, a second gate signal GS2 is applied to the second gate line GL2 to control the voltage-changing part VT. That is, the voltage-changing transistor TR_VT of the voltage changing part VT is turned on based on the second gate signal GS2.

When, the voltage-changing transistor TR_VT is turned on, the second pixel part 144 and a node of the voltage-increasing capacitor Cup and the voltage-decreasing capacitor Cdown are electrically connected to each other. Therefore, the first voltage V1 and the second voltage V2 are mixed to be formed as a third voltage V3. That is, the third voltage V3 is formed between the second pixel part 144 and the node of the voltage-increasing capacitor Cup and the voltage-decreasing capacitor Cdown. For example, when the first voltage V1 and the second voltage V2 are about −2 V and about 5 V, respectively, the third voltage V3 may be about 1.5 V.

As a result, the low pixel voltage VL of the second pixel part 144 may decrease from the second voltage V2 to the third voltage V3. The reference charging voltage VR formed between the voltage-increasing capacitor Cup and the voltage-decreasing capacitor Cdown may increase from the first voltage V1 to the third voltage V3.

When the reference charging voltage VR increases from the first voltage V1 to the third voltage V3, the domain-dividing voltage VD of the domain-dividing electrode 150 increases from the second voltage V2 to a fourth voltage by the voltage-changing capacitor Cup. For example, when the reference charging voltage VR increases to about 3.5 V, the domain-dividing voltage VD may increase by about 3.5 V. Therefore, the domain-dividing voltage VD may be increased from about 5 V to about 8.5 V.

Accordingly, when the second gate signals GS2 is applied to the second gate line GL2, the domain-dividing voltage VD is a relatively high level voltage, the high pixel voltage VH is a relatively medium level voltage, and the low pixel voltage VL is a relatively low level voltage.

Figure 7:
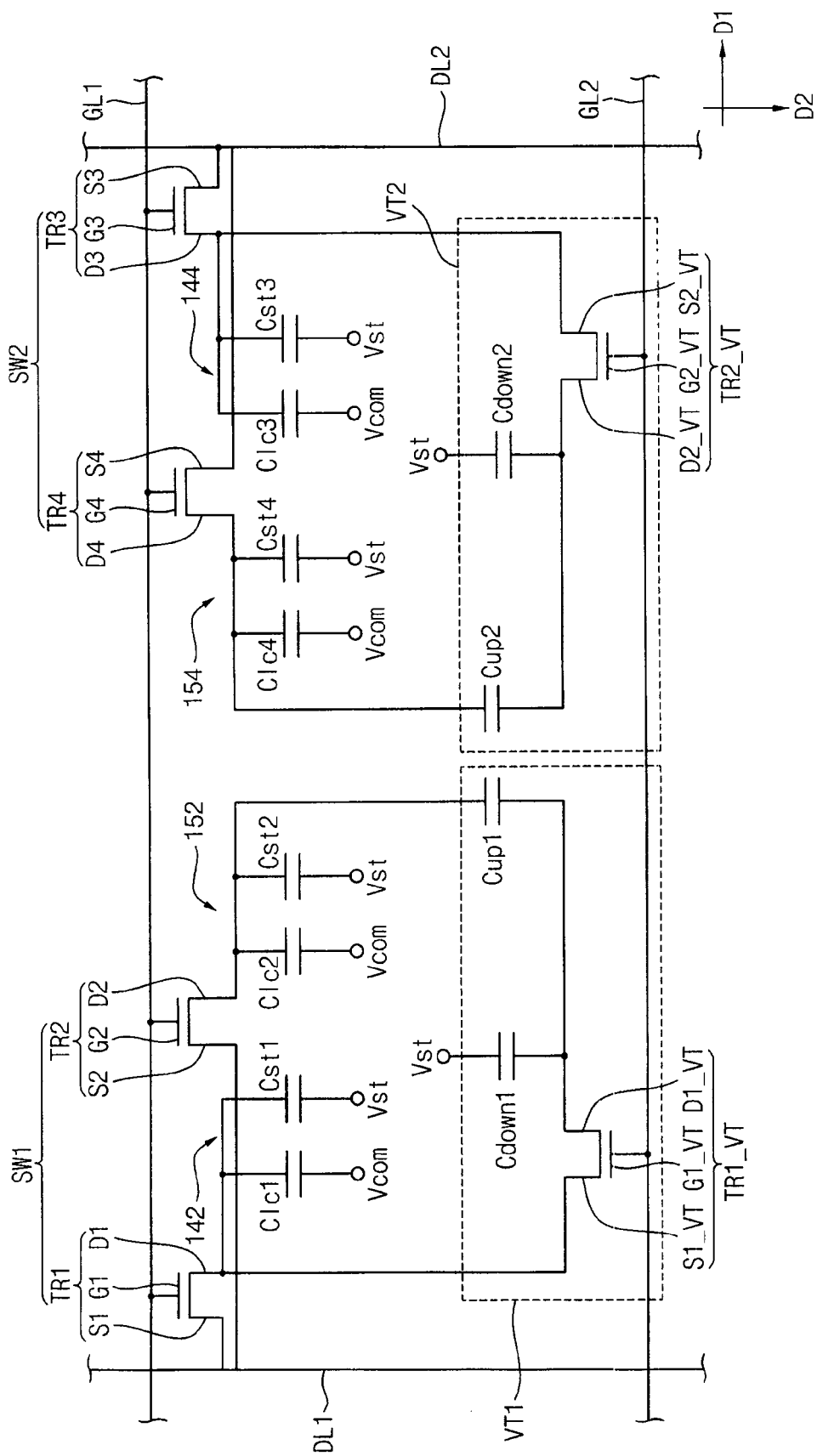
FIG. 7 is a schematic circuit diagram illustrating the relationship between the elements of the unit pixel of a display panel according to a second exemplary embodiment of the present invention.

FIG. 7 is a schematic circuit diagram illustrating an electric connecting relationship between the elements of the unit pixel of the display panel according to a second exemplary embodiment of the present invention.

Referring to FIG. 7, a display panel according to an exemplary embodiment includes a first gate line GL1, a second gate line GL2, a first data line DL1, a second data line DL2, a pixel electrode, a domain-dividing electrode, a first switching part SW1, a second switching part SW2, a first voltage-changing part VT1 and a second voltage-changing part VT2.

The first and second gate lines GL1 and GL2 are formed in a first direction D1. The first and second data lines DL1 and DL2 are formed in a second direction D2 substantially crossing the first direction D1. The first and second directions D1 and D2 may be substantially perpendicular to each other.

The pixel electrode includes a first pixel part 142 and a second pixel part 144 that are spaced apart from each other. The domain-dividing electrode may include a first division part 152 that divides the first pixel part 142, and a second division part 154 that divides the second pixel part 144. In this embodiment, the first and second division parts 152 and 154 are electrically isolated from each other.

The first switching element part SW1 is controlled by a first gate signal applied from the first gate line GL1 to output a first data signal applied from the first data line DL1 to the first pixel part 142 and the first division part 152, respectively. For example, the first switching element part SW1 may include a first transistor TR1 and a second transistor TR2.

The first transistor TR1 includes a first control electrode G1 electrically connected to the first gate line GL1, a first input electrode S1 electrically connected to the data line DL, and a first output electrode D1 electrically connected to the first pixel part 142.

The second transistor TR2 includes a second control electrode G2 electrically connected to the first gate line GL1, a second input electrode S2 electrically connected to the first data line DL1, and a second output electrode D2 electrically connected to the first division part 152.

The first voltage-changing part VT1 is controlled by a second gate signal applied from the second gate line GL2 to increase a voltage level of the first division part 152 and decrease a voltage level of the first pixel part 142. For example, the first voltage-changing part VT1 may include a first voltage-changing transistor TR1_VT, a first voltage-increasing capacitor Cup1 and a first voltage-decreasing capacitor Cdown1.

The first voltage-changing transistor TR1_VT includes a first voltage-changing control electrode G1_VT electrically connected to the second gate line GL2, a first voltage-changing input electrode S1_VT electrically connected to the first pixel part 142, and a first voltage-changing output electrode DL_VT.

The first voltage-increasing capacitor Cup1 includes a first terminal electrically connected to the first division part 152 and a second terminal electrically connected to the first voltage-changing output electrode D1_VT. The first voltage-decreasing capacitor Cdown1 includes a first terminal electrically connected to the first voltage-changing output electrode D1_VT and a second terminal receiving a reference voltage Vst.

The second switching element part SW2 is controlled by a first gate signal applied from the first gate line GL1 to output a second data signal applied from the second data line DL2 to the second pixel part 144 and the second division part 154, respectively. For example, the second switching element part SW2 may include a third transistor TR3 and a fourth transistor TR4.

The third transistor TR3 includes a third control electrode G3 electrically connected to the first gate line GL1, a second input electrode S3 electrically connected to the second data line DL2, and a second output electrode D3 electrically connected to the second pixel part 144.

The fourth transistor TR4 includes a fourth control electrode G4 electrically connected to the first gate line GL1, a fourth input electrode S4 electrically connected to the second data line DL2, and a fourth output electrode D4 electrically connected to the second division part 154.

The second voltage-changing part VT2 is controlled by a second gate signal applied from the second gate line GL2 to increase a voltage level of the second division part 154 and decrease a voltage level of the second pixel part 144. For example, the second voltage-changing part VT2 may include a second voltage-changing transistor TR2_VT, a second voltage-increasing capacitor Cup2 and a second voltage-decreasing capacitor Cdown2.

The second voltage-changing transistor TR2_VT includes a second voltage-changing control electrode G2_VT electrically connected to the second gate line GL2, a second voltage-changing input electrode S2_VT electrically connected to the second pixel part 144, and a second voltage-changing output electrode D2_VT.

The second voltage-increasing capacitor Cup2 includes a first terminal electrically connected to the second division part 154 and a second terminal electrically connected to the second voltage-changing output electrode D2_VT. The second voltage-decreasing capacitor Cdown2 includes a first terminal electrically connected to the second voltage-changing output electrode D2_VT and a second terminal receiving a reference voltage Vst.

Moreover, the display panel according to the present embodiment may further include a first liquid crystal capacitor Clc1, a first storage capacitor Cst1, a second liquid crystal capacitor Clc2, a second storage capacitor Cst2, a third liquid crystal capacitor Clc3, a third storage capacitor Cst3, a fourth liquid crystal capacitor Clc4 and a fourth storage capacitor Cst4.

The first liquid crystal capacitor Clc1 includes a first terminal electrically connected to the first pixel part 142 and a second terminal receiving a common voltage Vcom. The first storage capacitor Cst1 includes a first terminal electrically connected to the first pixel part 142 and a second terminal receiving the reference voltage Vst.

The second liquid crystal capacitor Clc2 includes a first terminal electrically connected to the first division part 152 and a second terminal receiving a common voltage Vcom. The second storage capacitor Cst2 includes a first terminal electrically connected to the first division part 152 and a second terminal receiving the reference voltage Vst.

The third liquid crystal capacitor Clc3 includes a first terminal electrically connected to the second pixel part 144 and a second terminal receiving a common voltage Vcom. The third storage capacitor Cst3 includes a first terminal electrically connected to the second pixel part 144 and a second terminal receiving the reference voltage Vst.

The fourth liquid crystal capacitor Clc4 includes a first terminal electrically connected to the second division part 154 and a second terminal receiving a common voltage Vcom. The fourth storage capacitor Cst4 includes a first terminal electrically connected to the second division part 154 and a second terminal receiving the reference voltage Vst.

In this exemplary embodiments, one gate line and one data line (i.e., 1G1D structure) define a unit pixel of the display panel as shown in FIG. 5, and one gate line and two data lines (i.e., 1G2D structure) define a unit pixel of the display panel as shown in FIG. 7, however the unit pixel may be also otherwise defined.

According to the present invention, since a domain-dividing electrode dividing first and second pixel parts is formed in a first array substrate, a viewing angle of images may be enhanced even though a common electrode of an opposite substrate is not patterned.

Moreover, as an opening formed by a patterning is not formed in a common electrode of the opposite substrate, a texture error generated in a portion of the opening may be prevented. Therefore, the display panel according to the present invention may display an image having a wide viewing angle.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An array substrate comprising:
   first and second gate lines extending in a first direction;
   a data line extending in a second, different direction, the data line crossing the first and second gate lines;
   a pixel electrode having a first pixel part and a second pixel part, the first and second pixel parts being spaced apart;
   a domain-dividing electrode dividing the first and second pixel parts into a plurality of areas;
   first, second and third switching elements each having a control electrode coupled to the first gate line, the first, second and third switching elements being controlled by a first gate signal applied from the first gate line, the first, second and third switching elements being operative to apply a data signal received from the data line to the first and second pixel parts and the domain-dividing electrode, respectively; and
   a voltage-changing part coupled to the second gate line and being controlled by a second gate signal applied from the second gate line, the voltage-changing part being operative to increase a voltage level of the domain-dividing electrode and decrease a voltage level of the second pixel part.

2. The array substrate of claim 1, wherein the voltage-changing part comprises:
   a voltage-changing transistor including a voltage-changing control electrode electrically connected to the second gate line, a voltage-changing input electrode electrically connected to the second pixel part, and a voltage-changing output electrode;
   a voltage-increasing capacitor including a first increasing electrode electrically connected to the domain-dividing electrode and a second increasing electrode electrically connected to the voltage-changing output electrode; and
   a voltage-decreasing capacitor including a first decreasing electrode electrically connected to the voltage-changing output electrode and a second decreasing electrode coupled to a reference voltage terminal.

3. The array substrate of claim 2, wherein the voltage-changing output electrode overlaps a portion of the domain-dividing electrode to form the voltage-changing capacitor.

4. The array substrate of claim 2, further comprising:
   a storage line being overlapped with a portion of the first and second pixel parts to receive the reference voltage, wherein the voltage-changing output electrode is overlapped with a portion of the storage line so as to form the voltage-decreasing capacitor.

5. The array substrate of claim 4, wherein the storage line comprises:
   a main storage part being formed adjacent to the second gate line along the first direction to be overlapped with a portion of the voltage-changing output electrode; and
   a sub-storage part being protruded from the main storage part to be overlapped with a portion of the first and second pixel parts.

6. The array substrate of claim 5, wherein the sub-storage part comprises:
   a first storage line being formed along the second direction to be overlapped with a portion of at least one of the first and second pixel parts; and
   a second sub storage line being formed along the second direction to be opposite to the first sub storage line, the second sub storage line being overlapped with a portion of another of the first and second pixel parts.

7. The array substrate of claim 1, wherein the domain-dividing electrode comprises:
   a first division part spaced apart from the first pixel part to divide the first pixel part; and
   a second division part spaced apart from the second pixel part to divide the second pixel part.

8. The array substrate of claim 7, wherein the first division part divides the first pixel part into two portions along a central portion of the first pixel part, and
   the second division part divides the second pixel part into two portions along a central portion of the second pixel part.

9. The array substrate of claim 7, wherein the second pixel part surrounds an external portion of the first pixel part.

10. The array substrate of claim 1, further comprising:
    a first insulating layer covering the gate line; and
    a second insulating layer covering the data line formed on the first insulating layer.

11. The array substrate of claim 10, wherein the pixel electrode and the domain-dividing electrode are formed on the second insulating layer.

12. The array substrate of claim 11, further comprising:
    an insulating structure formed between the domain-dividing electrode and the second insulating layer.

13. The array substrate of claim 10, wherein:
    the pixel electrode is formed on the second insulating layer; and
    the domain-dividing electrode interposed between the first and second insulating layers.

14. The array substrate of claim 1, wherein:
    the first switching element comprises a first control electrode
    electrically connected to the first gate line, a first input electrode electrically connected to the data line, and a first output electrode electrically connected to the first pixel part;
    the second switching element comprises a second control electrode electrically connected to the first gate line, a second input electrode electrically connected to the data line, and a second output electrode electrically connected to the second pixel part; and
    the third switching element comprises a third control electrode electrically connected to the first gate line, a third input electrode electrically connected to the data line, and a third output electrode electrically connected to the domain-dividing electrode.

15. An array substrate comprising:
first and second gate lines extending in a first direction;
first and second data lines extending in a second, different direction, the data line crossing the first and second gate lines;
a pixel electrode having first and second pixel parts that are spaced apart from each other;
a domain-dividing electrode having a first division part that divides the first pixel part into a plurality of areas and a second division part that divides the second pixel part into a plurality of areas;
first and second switching elements being controlled by a first gate signal applied from the first gate line, the first and second switching elements applying a first data signal applied from the first data line to the first pixel part and the first division part, respectively;
a first voltage-changing part being controlled by a second gate signal applied from the second gate line, the first voltage-changing part increasing a voltage level of the first division part and decreasing a voltage level of the first pixel part;
third and fourth switching elements being controlled by the first gate signal a second voltage-changing part applying a second data signal applied from the second gate line to the second pixel part and the second division part, respectively; and
the second voltage-changing part being controlled by the second gate signal, the second voltage-changing part increasing a voltage level of the second division part and decreasing a voltage level of the second pixel part.

16. A display panel comprising:
an array substrate;
an opposite substrate opposite the array substrate; and
a liquid crystal layer interposed between the array and opposite substrates, wherein the array substrate comprises:
first and second gate lines formed in a first direction;
a data line formed in a second direction crossing the first direction;
a pixel electrode having first and second pixel parts that are spaced apart from each other;
a domain-dividing electrode dividing the first and second pixel parts into a plurality of areas, respectively;
first, second and third switching elements being controlled by a first gate signal applied from the first gate line, the first, second and third switching elements applying a data signal applied from the data line to the first and second pixel parts and the domain-dividing electrode, respectively; and
a voltage-changing part being controlled by a second gate signal applied from the second gate line, the voltage-changing part increasing a voltage level of the domain-dividing electrode and decreasing a voltage level of the second pixel part.

17. The display panel of claim 16, wherein the opposite substrate comprises a common electrode to receive a common voltage.

* * * * *